S. E. DAVIS.
FARM TRACTOR.
APPLICATION FILED JUNE 24, 1916. RENEWED JULY 5, 1919.

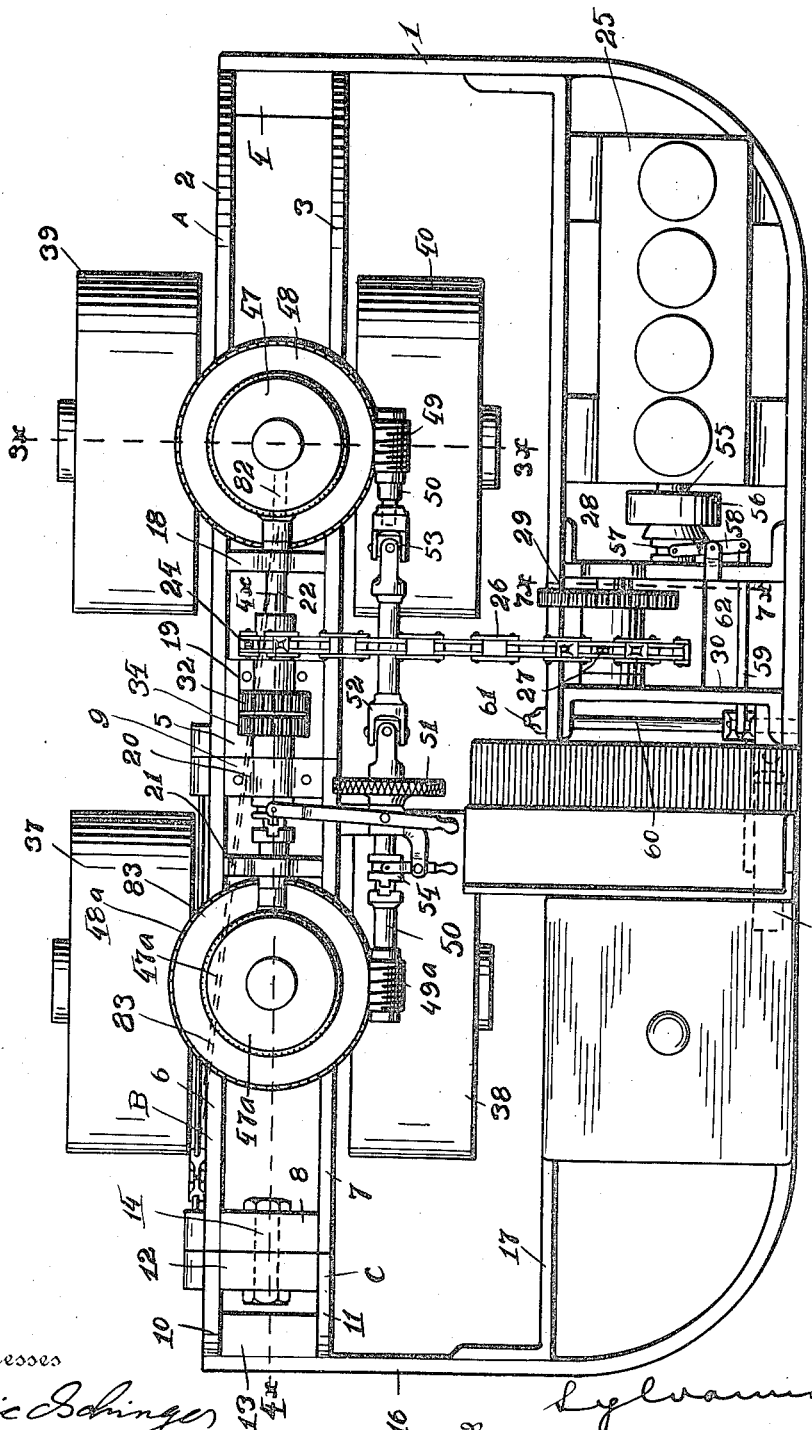

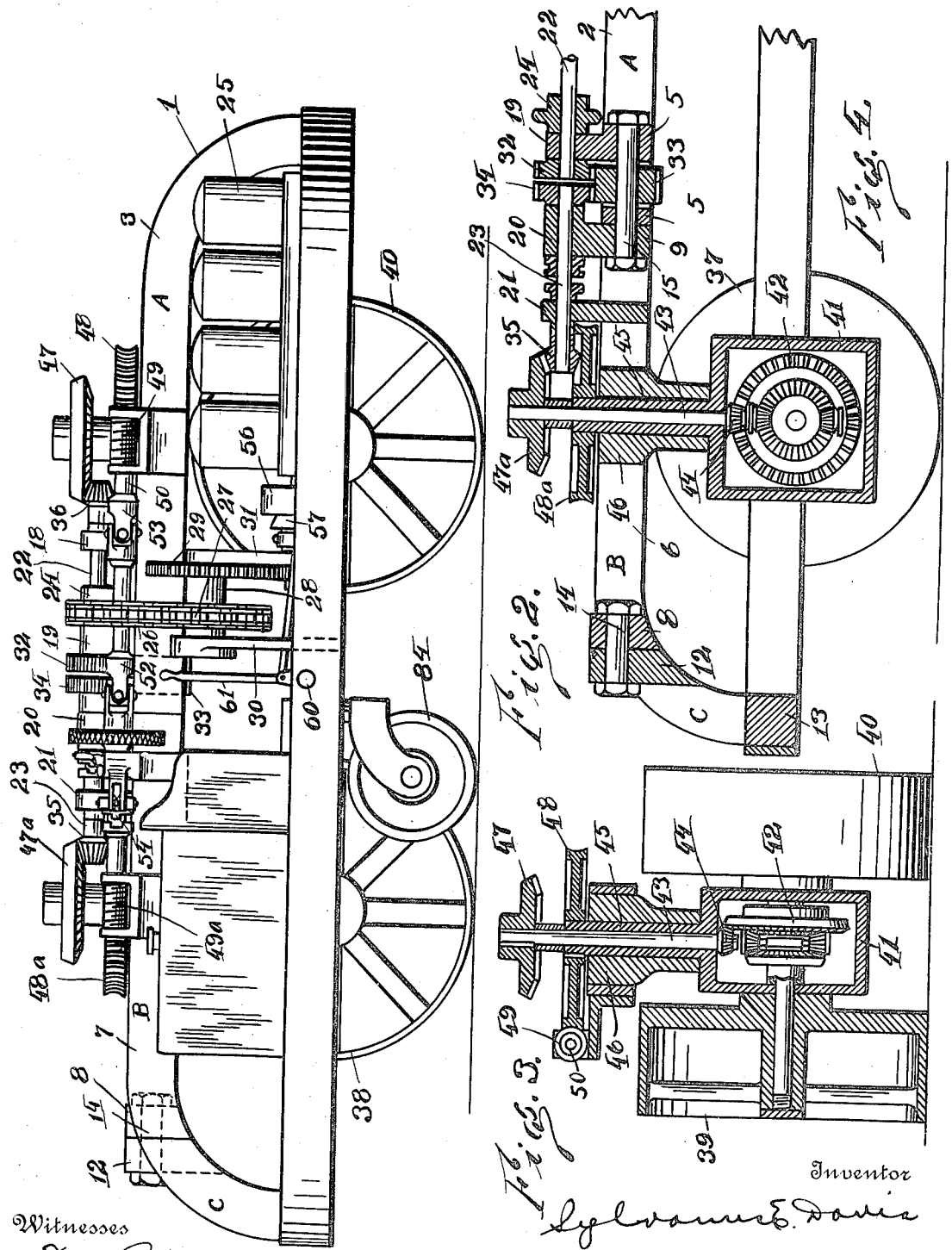

1,321,093.

Patented Nov. 11, 1919.
3 SHEETS—SHEET 3.

WITNESSES:
Eric Schinger
Edna K. Booth

INVENTOR
Sylvanus E. Davis
BY
Frank Keifer
ATTORNEY

UNITED STATES PATENT OFFICE.

SYLVANUS E. DAVIS, OF ALFRED, NEW YORK, ASSIGNOR OF ONE-HALF TO GEORGE W. FRECKLETON, OF ROCHESTER, NEW YORK.

FARM-TRACTOR.

1,321,093. Specification of Letters Patent. Patented Nov. 11, 1919.

Application filed June 24, 1916, Serial No. 105,645. Renewed July 5, 1919. Serial No. 308,836.

*To all whom it may concern:*

Be it known that I, SYLVANUS E. DAVIS, a citizen of the United States, residing at Alfred, in the county of Allegany and State of New York, have invented certain new and useful Improvements in Farm-Tractors, of which the following is a specification.

My present invention relates to vehicles and more particularly to draft vehicles and it has for its object to provide a simple, strong and efficient tractor adapted for farm work. The improvements are directed in part toward providing improved means for adapting the structure of the tractor to inequalities of the ground; toward the drive gearing of the respective ground wheels and toward the steering and clutch controls. To these and other ends the invention resides in certain improvements and combination of parts, all as will be hereafter described, the novel features being pointed out in the claims at the end of the specification.

In the drawings Figure 1 is a top plan view of my improved tractor.

Fig. 2 is a side elevation of the tractor.

Fig. 3 is a vertical section on the line $3^x$—$3^x$ of Fig. 1.

Fig. 4 is a section on the line $4^x$—$4^x$ of Fig 1.

In the drawings like reference numerals indicate like characters.

Figure 5:
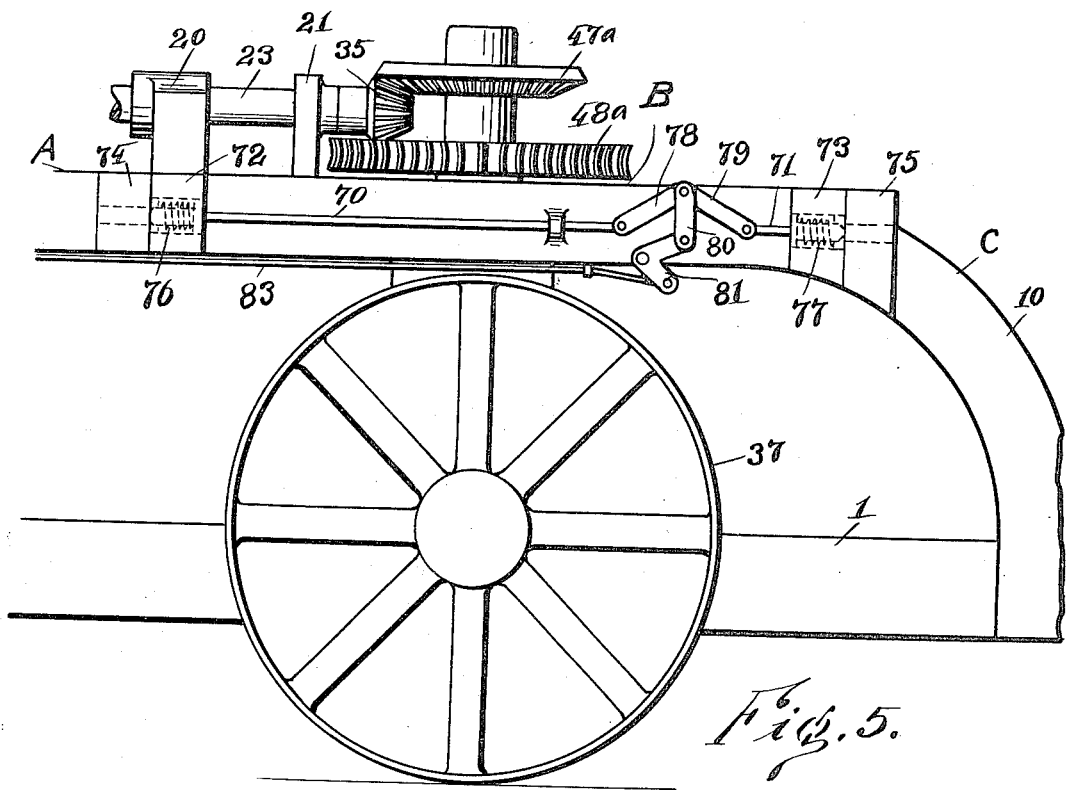
Fig. 5 is a side elevation of the machine partly broken away showing the machine as viewed from the side opposite to that shown in Fig. 2.
Figures 6, 7:
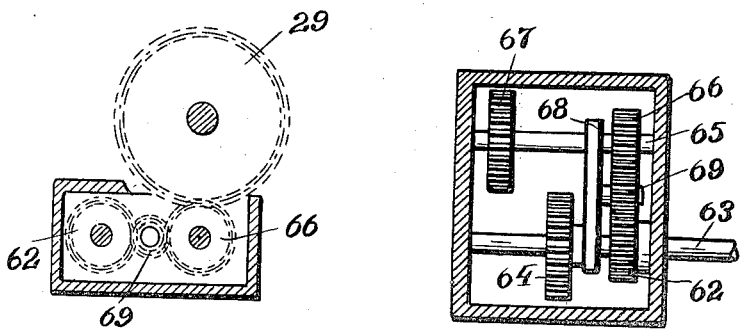
Fig. 6 is a detail plan view of the reversing gears.
Fig. 7 is a vertical section on the line $7^x$—$7^x$ of Figs. 1 and 6.

Reference numeral 1 indicates the frame of the machine which frame is made up of three sections A, B, and C as follows:

The section A is made up of the bars 2 and 3 which are coupled together at their ends by blocks 4 and 5, this section forming one half of the main or central frame of the tractor. The section B is made up of the bars 6 and 7 which are connected by the blocks 8 and 9. The section C is made up of the bars 10 and 11 which are connected by the blocks 12 and 13. The section B comprising the bars 6 and 7 and blocks 8 and 9 is swiveled between the two other sections of the main frame, center pins 14 and 15 being used for connecting these sections of the frame together.

Connected to the blocks 4 and 13 is the outriding frame 16 which extends completely around one side of the tractor and carries therein a brace 17.

Mounted on the section A of the main central frame are the journal boxes 18 and 19 which boxes are rigid therewith. The journal boxes 20 and 21 are mounted on the section B. In the journal boxes 18 and 19 is mounted to rotate the shaft 22. In the journal boxes 20 and 21 is mounted to rotate the shaft 23. Keyed to the shaft 22 is the sprocket wheel 24 by which the shaft 22 is driven from the engine or motor 25 through the sprocket chain 26, the said sprocket chain running over a sprocket wheel 27 mounted to revolve on a shaft or spindle 28. The pinion 29 is integral with the hub of this sprocket wheel 27. The shaft or spindle 28 is supported between the brackets 30 and 31 which are in turn clamped between the frame 16 and the brace 17.

The shaft 22 is driven in the manner described and the motion of the shaft 22 is communicated to the shaft 23 through the mechanism which I will now describe.

The pinion 32 is keyed to the end of the shaft 22 and revolves therewith. Mounted on the pin 15 is the pinion 33 which pinion is free to rotate in a recess formed in the block 5. Keyed to the end of the shaft 23 is the pinion 34 which pinion meshes with the pinion 33 and is driven through the pinion 33 from the shaft 22.

Keyed to the left hand end of the shaft 23 is a beveled pinion 35 and keyed to the right hand end of the shaft 22 is the beveled pinion 36, through which the power of the engine is transmitted to the driving wheels of the tractor in the manner I will now describe.

The tractor frame is supported by four wheels 37, 38 and 39 and 40 arranged in pairs as shown in Fig. 1. The wheels 37 and 38 are driven from the pinion 35 and the wheels 39 and 40 are driven from the pinion 36. Between each pair of wheels is supported a gear casing 41 from which shafts extend into each of the wheels to which shafts the wheels are rigidly fastened. Mounted in the gear casing is the differential gear 42, which gear may be of any of the well known types and is driven from the vertical shaft 43 having the beveled pinion 44 on the bottom thereof which meshes with the large pinion of the differential gear. The shaft 43 extends up through a sleeve 45 which is integral with the gear casing which sleeve is swiveled in the bearing block 46 which block is rigid with the section of the frame. Keyed to the top of the shaft 43 is the beveled pinion 47 which is driven by the pinion 36.

At the opposite end of the machine the wheels 37 and 38 support the section A of the frame and are driven in like manner, except that the differential gear 42 is placed on the opposite side of the gear casing, so as to cause all of the four wheels to revolve in the same direction, this being necessary for the reason that the pinions 35 and 36 are oppositely placed with reference to their pinions 47 and 47$^a$.

For the purpose of steering the tractor a worm gear 48 is provided which gear is keyed to the sleeve 45 located between the wheels 39 and 40. A similar worm gear 48$^a$ is provided keyed to a similar sleeve 45 located between the wheels 37 and 38.

The worm gear is driven by the worm 49 mounted on one end of the shaft 50. A similar worm 49$^a$ is located at the other end of the shaft, so that these worms may be turned in unison from the hand wheel 51. Universal joints 52 and 53 are placed in the shaft to make it flexible corresponding to the flexibility of the main frame. The universal joint 53 is splined on the end section of the shaft 50 so as to accommodate itself to the different positions that it may assume. A clutch 54 is interposed at the left hand end of the shaft 50 so that the worm 49$^a$ may be connected to or disconnected from the hand wheel 51 at will.

For the purpose of reversing the movement of the tractor I provide the shifting mechanism as follows:

55 is the engine shaft to which is connected the clutch 56, the male member 57 of which is operated by a lever 58, link 59, rock shaft 60 and handle 61. By the operation of this mechanism the tractor may be started and stopped.

For the purpose of reversing it I provide the following mechanism. The pinion 62 is driven through the clutch 56, which pinion is rotated continuously in the same direction. The pinion 62 is integral with the shaft 63 and the pinion 64 is splined thereon and can move back and forth thereon. Opposite to the shaft 63 is a shaft 65 on which are provided the pinions 66 and 67 which are rigid with the shaft 65. Mounted between the two shafts 63 and 65 is the sliding frame 68 on which is supported a spindle carrying the pinion 69. This frame and pinion 69 slides back and forth with the pinion 64 the pinion 69 being normally in mesh with the pinions 62 and 66 to drive the tractor in one direction and the pinion 64 being capable of moving into engagement with the pinion 67 taking the pinion 69 out of engagement with the pinions 62 and 66 for the purpose of driving the tractor in the opposite direction. The frame 68 is moved backward and forward by a suitable lever.

I have heretofore described section B of the main frame as being swiveled at both ends on sections A and C. The swiveling of the sections is necessary in order to permit the wheels to conform to the contour of the ground over which the tractor passes, the ground being usually very uneven and the gearing comprising the shafts 22 and 23 and the gears 32, 33 and 34 is adapted to maintain driving connection with the wheels of section B, while section B is rocking with reference to sections A and C. It will be understood that normally shafts 22 and 23 will be in line with each other, but as section B rocks from its normal position shaft 23 and gear 34 will travel with it radially around the pin 15, and the gear 33 with the gear 34 remaining in mesh with the gear 33.

After both pairs of wheels have been turned beyond a particular angle out of parallelism with the main frame there is a tendency of the wheels which support section B to run ahead or lag behind and to prevent this tendency it is necessary to lock section B to sections A and C so that it can no longer swivel. This result is secured by the mechanism illustrated in Fig. 5, in which figure on section B is mounted the endwise moving locking pins 70 and 71, which pins pass through lugs 72 and 73 fastened on section B. Similar lugs 74 and 75 are provided on sections A and C. These lugs are perforated to permit the sliding of the pins therethrough, the lugs 74 and 75 being perforated to receive the pins alone and the lugs 72 and 73 being perforated to receive the pins and the springs 76 and 77, which surround them, which springs engage with collars carried on the pins and operate to hold the pins back normally out of engagement with the lugs 74 and 75. Collars are provided in the lugs 72 and 73 to hold the springs and pins in place. When it is desired to drive the pins into engagement with the lugs 74 and 75 this can be accomplished by straightening the toggles 78 and 79 for which purpose the link 80 and bell crank 81 are provided, the bell crank 81 being pivotally mounted on the section B.

This bell crank can be manually operated or it can be automatically operated by the connection which I will now describe.

Fastened to the gear casing 41 is an arm 82 to which is connected a rope or chain 83, which rope is connected at its opposite end to the bell crank 81. While the wheels 38, 37, 39 and 40 are in the position as shown in Fig. 1 this rope will be slack, but after the wheels 39 and 40 have turned beyond the given angle the arm 82 will begin to draw on the rope 83 and will cause the bell crank 81 to rock, straightening the toggles, driving the pins into engagement with sections A and C, positively locking the three sections together.

To prevent the frame from tipping an idle wheel 84 is provided on the outriding frame 16.

The tractor as I have heretofore described it provides for running all four wheels in parallelism so that the tractor will move forward or laterally as a whole. If, however, it is desired to swing the tractor this can be done by driving the wheels 39 and 40 alone turning them in the desired direction, leaving the wheels 37 and 38 to trail after them.

For this purpose the clutch 90 is provided in the shaft 23 by which the pinion 35 may be disconnected from the shaft and from the motive power of the machine.

It will be seen that a tractor built in accordance with the foregoing will be flexible and easy in its operation, being capable of traversing uneven ground and running forward or backward or sidewise or diagonally at will.

I claim;

1. In a tractor, the combination of a frame having end sections rigid with respect to each other and an intermediate section swiveled between said end sections, supporting wheels under said intermediate section and under one of said end sections.

2. In a tractor, the combination of a frame having a plurality of sections therein, one of said sections being swiveled on the other section at a point above the horizontal plane of the axles of the supporting wheels, supporting wheels under each of said sections, driving mechanism supported by said sections for driving the wheels under both sections from a single source of power, and means located co-axially with the swivel for transmitting the power from one section to the other.

3. In a tractor, the combination of a frame having a rigid section and a swiveled section in line therewith, a driving shaft mounted on one of said sections, said shaft being connected to the source of power, a driven shaft on the other section, radial gearing placed between the sections to drive the last named shaft from the first, irrespective of the position of the swiveled section, said shafts being supported to rock sidewise into and out of line with each other.

4. In a tractor, the combination of a frame having a rigid section and a swiveled section in line therewith, a driving shaft mounted on one of said sections, said shaft being connected to the source of power, a driven shaft on the other section, radial gearing placed between the sections to drive the last named shaft from the first, irrespective of the position of the swiveled section, and wheels under each of said sections driven in unison from said shafts, said shafts being supported to rock sidewise into and out of line with each other.

5. In a tractor, the combination of a frame having a rigid section and a swiveled section in line therewith, a driving shaft mounted on one of said sections, said shaft being connected to the source of power, a driven shaft on the other section, radial gearing placed between the sections to drive the last named shaft from the first, irrespective of the position of the swiveled section, wheels under each of said sections driven in unison from said shaft, and means for turning the wheels under one or both of said sections for the purpose of steering said tractor, said shafts being supported to rock sidewise into and out of line with each other.

6. In a tractor, the combination of a frame having a plurality of sections therein, one of said sections being swiveled on the other section, supporting wheels under each of said sections, driving mechanism supported by said sections for driving the wheels under both sections from a single source of power, and means for locking said sections together, said driving mechanism including a shaft on each section, said shafts being supported to rock sidewise into and out of line with each other.

7. In a tractor, the combination of a frame having a plurality of sections therein, one of said sections being swiveled on the other section, supporting wheels under each of said sections, driving mechanism supported by said sections for driving the wheels under both sections from a single source of power, said supporting wheels being capable of being turned under the sections for the purpose of steering the tractor, and means operated upon the turning of said supporting wheels by a predetermined amount to lock said sections together.

8. In a frame for a tractor, the combination of two sections, a pin connecting said sections and holding them in line with each other, said sections being swiveled thereby, a gear mounted to rotate on said pin, and a pinion mounted to rotate on and swing with each section, each independent of the other, each of said pinions meshing with said gear, one of said pinions driving the other pinion through said gear.

9. In a tractor, the combination of an elevated frame made of sections, wheels arranged in pairs under each section, a gear casing between the wheels of each pair, a bearing block supported on said casing, said sections being supported by said bearing block, a shaft extending horizontally along and over said sections, said shaft being divided into two parts, each part being mounted on one of the sections and moving therewith, said parts being geared together and having geared connections with each pair of wheels under said sections.

10. In a tractor, the combination of two sections, a pin connecting said sections and holding them in line with each other, said pin making a swiveled connection between the sections, a gear mounted to rotate on said pin, a pinion mounted to rotate on and swing with one of said sections, said pinion meshing with said gear and being driven thereby, and means for driving said gear from the other section.

11. In a tractor, the combination of two sections, a pin connecting said sections and holding them in line with each other, said pin making a swiveled connection between the sections, a gear mounted to rotate on said pin, a pinion mounted to rotate on and swing with one of said sections, said pinion meshing with said gear and being driven thereby, and means for driving said gear from the other section, said gear being located between the sections.

12. In a tractor, the combination of two sections, one of said sections being swiveled on the other section, a gear mounted to rotate in line with the swiveled joint between the sections, a pinion mounted to rotate on and swing with one of said sections, said pinion meshing with said gear and being driven thereby, and means on the other section for rotating said gear.

13. In a tractor, the combination of two sections, one of said sections being swiveled on the other section, a gear mounted to rotate in line with the swiveled joint between the sections, a pinion mounted to rotate on and swing with one of said sections, said pinion meshing with said gear and being driven thereby, and means on the other section for rotating said gear, said gear being located between the sections.

14. In a tractor, the combination with two ground wheel sections having independent ground wheel gearing and a swivel connecting the sections having a concentric gear thereon, of a shaft on one of the sections for driving the ground wheel gearing thereof and provided with a gear meshing with the swivel gear, said shaft being parallel with the axis of the swivel, driving connections between the swivel gear and the other ground wheel gearing and a prime mover arranged to drive one of said gears through the other.

15. In a tractor, the combination with two ground wheel sections having independent ground wheel gearing and a swivel connecting the sections, of a shaft on one of the sections for driving the ground wheel gearing thereof, said shaft being parallel with the axis of the swivel, a similarly arranged shaft on the other section for driving the other ground wheel gearing and means in coaxial alinement with the swivel for driving one shaft through the medium of the other.

16. In a tractor, the combination with two ground wheel sections having independent ground wheel gearing and two shafts for respectively driving the same, of a swivel parallel with the shafts and connecting the frames and means on the swivel for driving one shaft through the medium of the other.

17. In a tractor, the combination with two ground wheel sections having independent ground wheel gearing and two shafts for respectively driving the same, of a swivel connecting the sections arranged parallel with the said shafts, a gear thereon and pinions on the shafts meshing with said gear and also revoluble about it independently of each other.

In testimony whereof I affix my signature in presence of two witnesses.

SYLVANUS E. DAVIS.

Witnesses:
EDNA K. BOOTH,
ELEANOR M. CORCORAN.